(12) United States Patent
Chen

(10) Patent No.: US 8,915,654 B2
(45) Date of Patent: Dec. 23, 2014

(54) OPTICAL MULTI-PORT CONNECTORS

(71) Applicant: Verizon Patent and Licensing Inc., Arlington, VA (US)

(72) Inventor: David Zhi Chen, Richardson, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 92 days.

(21) Appl. No.: 13/652,639

(22) Filed: Oct. 16, 2012

(65) Prior Publication Data

US 2014/0105540 A1    Apr. 17, 2014

(51) Int. Cl.
*G02B 6/38* (2006.01)
*G02B 6/36* (2006.01)

(52) U.S. Cl.
USPC ............ 385/71; 385/70; 385/72; 385/75; 385/77; 385/84; 385/85

(58) Field of Classification Search
CPC .. G02B 6/3835; G02B 6/3855; G02B 6/3861; G02B 6/3863
USPC .................................. 385/71, 84, 85
See application file for complete search history.

(56) References Cited

U.S. PATENT DOCUMENTS 6,827,500 B2 * 12/2004 Basavanhally et al. ......... 385/80
2005/0213893 A1 * 9/2005 Hamasaki et al. .............. 385/80

* cited by examiner

*Primary Examiner* — Ryan Lepisto

(57) ABSTRACT

A connector comprising a base formed using a base material with an obverse face, a reverse face, and at least one wall member that defines the perimeter of the base; a multiplicity of inserts each having a first end and a second end, which extend through the base; wherein the inserts are of a different material than the base material, and the inserts are generally parallel to one another, wherein a single hole extends longitudinally through each of at least a subset of the inserts, and wherein each hole is configured to receive a single optical fiber; and a method of making the connector.

15 Claims, 5 Drawing Sheets

US 8,915,654 B2

OPTICAL MULTI-PORT CONNECTORS

BACKGROUND

Multi-port connectors allow users to easily connect a plurality of fiber optic cables containing multiple fibers to one another. However, it can be difficult to create a connector that will enable a good connection between the all the fiber pairs in the cables. A fiber optic cable may have up to two dozen fibers or, in some cases, more than two dozen fibers. A connector may be attached to each end of the collection of fibers within a fiber optic cable, with each fiber extending through the connector to mate with a fiber from a second connector at an end of a second fiber optic cable. In a good connection, the end of each fiber in one cable should be concentrically aligned with and abut the end of a fiber in the second cable. Since each connector may have many fibers to connect, it can be difficult to control the alignment and the amount of space between the optical fibers, thereby making it difficult to achieve good connection.

In a desired multi-port connection, each of the fibers in a fiber pairs are in concentric alignment with one another, and the core of each fiber contacts the core of the opposing fiber in the fiber pair. The core-to-core connection and concentric alignment of the fiber pairs allows robust transmission with little attenuation and return loss and low insertion loss. Gaps between the ends of the fiber pairs can result in higher insertion losses in the transmission. If fiber pairs are out of alignment, there may be higher levels of attenuation when the pairs are connected. When connecting two multi-port connectors, fibers that protrude too far from one connector may push against the opposing fiber in the second connector. These head-on forces may force the fiber pair out of concentric alignment and, if they are angle polished connectors, will result in higher levels of insertion loss. Multi-port connectors having fibers that contact one another and which are concentrically aligned with and abut one another may produce better transmissions with less loss and reflectance and reduced noise.

DETAILED DESCRIPTION

Figure 1:
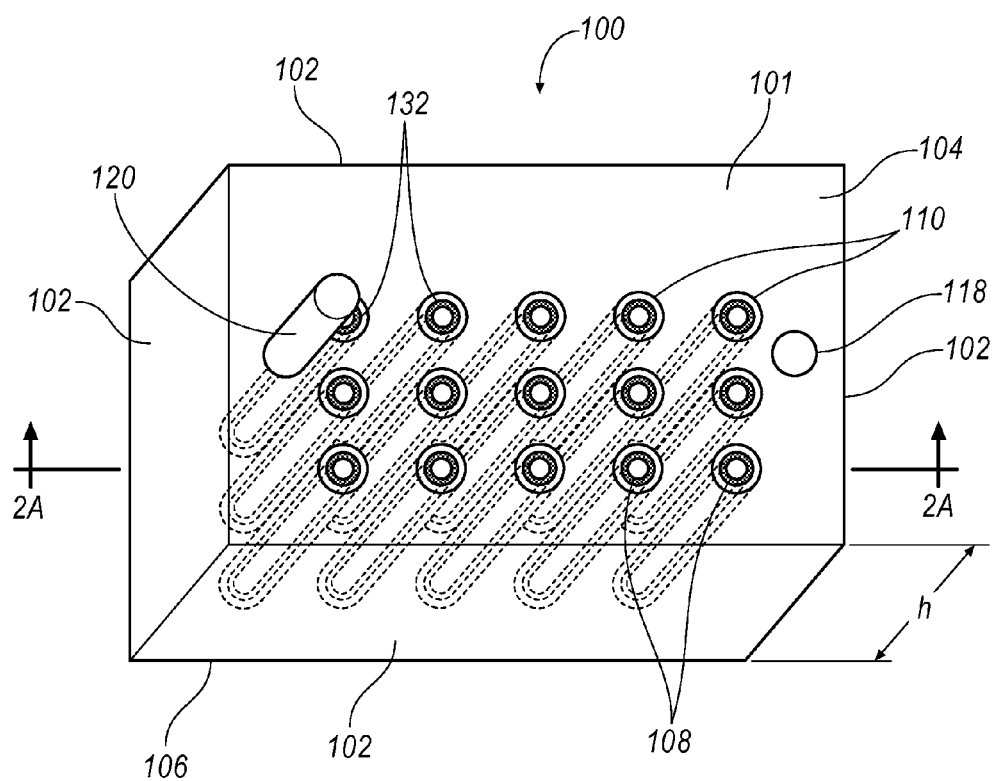
FIG. 1 illustrates an exemplary system for an optical multi-port connector.

Referring now to the discussion that follows and also to the drawings, illustrative approaches to the disclosed apparatuses and methods are shown in detail. Although the drawings represent some possible approaches, the drawings are not necessarily to scale and certain features may be exaggerated, removed, or partially sectioned to better illustrate and explain the disclosed device. Further, the descriptions set forth herein are not intended to be exhaustive or otherwise limit or restrict the claims to the precise forms and configurations shown in the drawings and disclosed in the following detailed description.

When mating or joining separate fiber optic cables, the optical fiber pairs in the connector at the end of each set of fibers should be in alignment with and in contact with each other so there is at most a minimal gap between the fibers, but the fibers should not be so long so that they push against one another, forcing them out of alignment. Proper concentric alignment allows the cores of the respective fibers to contact while not pushing against one another, thereby facilitating robust signal transmission. When joining a single pair of optical fibers, it is relatively easy to properly align and space the fibers. However, when working with multiple pairs of fibers, such as would be the situation when joining ribbon cables or other fiber optic cables carrying a multiplicity of fibers, it is more difficult to align and space all the pairs of fibers.

Desired connections between pairs of optical cables within a fiber optic cable result in less signal loss and reduced noise in signal transmission. Desired connections generally include concentric alignment between pairs of fibers in a connection and core-to-core contact without gaps between fiber pairs while avoiding fiber misalignment through undesired biased engagement. Fibers that extend too far from the base of the connector may push against the opposing fibers in the opposing connector, forcing the pair of fibers out of concentric alignment. This, in turn, may result in more losses than with properly aligned fibers. Fibers that do not extend far enough may result in gaps between the fiber pairs, and concomitant higher noise levels in the transmission.

Enveloping the fibers in a material that has enough flexibility to allow the fibers to regress away from opposing fibers to avoid pressures that would force the fibers out of alignment allows proper alignment of fibers. Precision drilling allows precise positioning of holes for fibers and thereby, precise positioning of the fibers themselves. A system that enables effective connections between the optical fibers of mating ribbon cables and a method of manufacturing the device is shown and described.

Figure 2A:
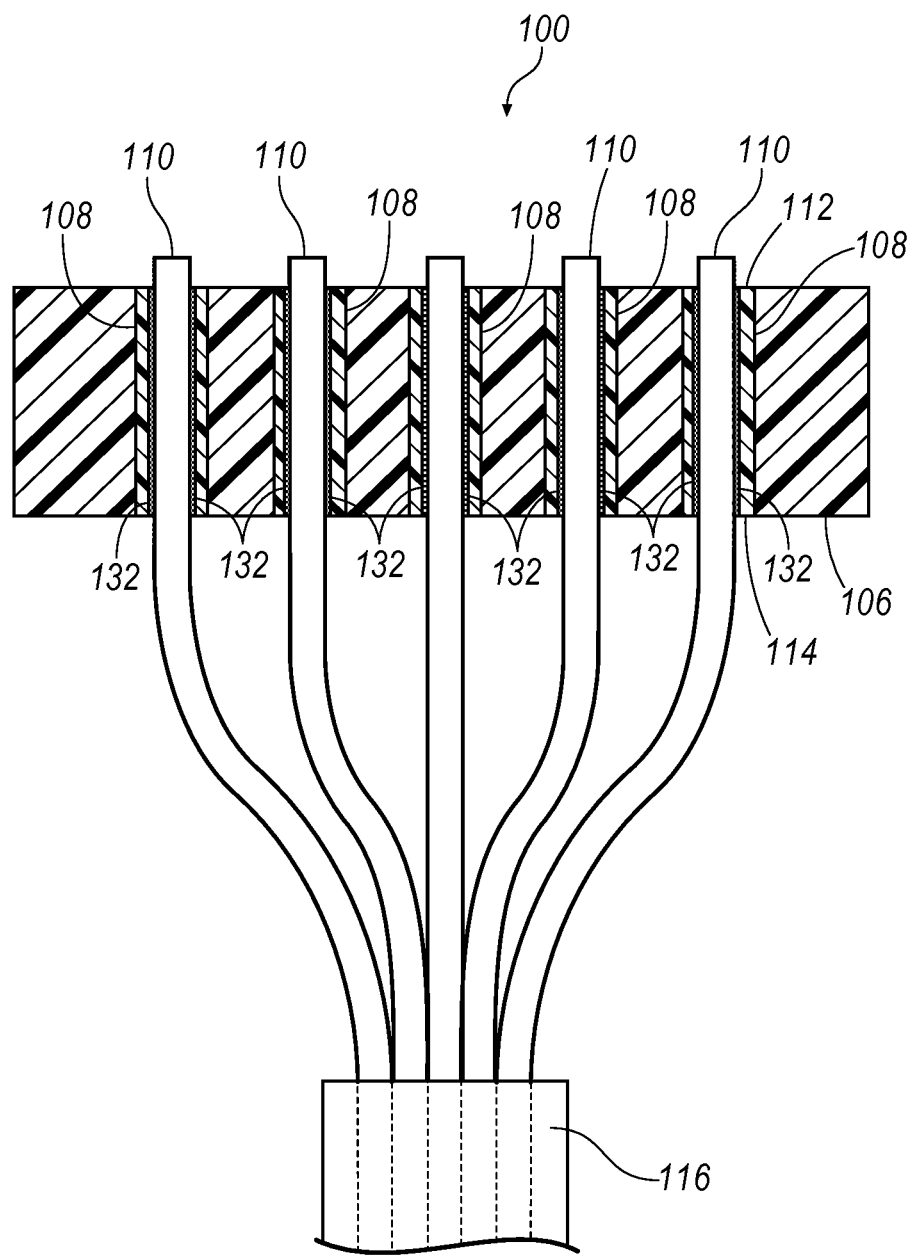
FIG. 2A illustrates a side cross-sectional view of one arrangement of the exemplary optical multi-port connector shown in FIG. 1, taken along line 2A-2A.
Figure 2B:
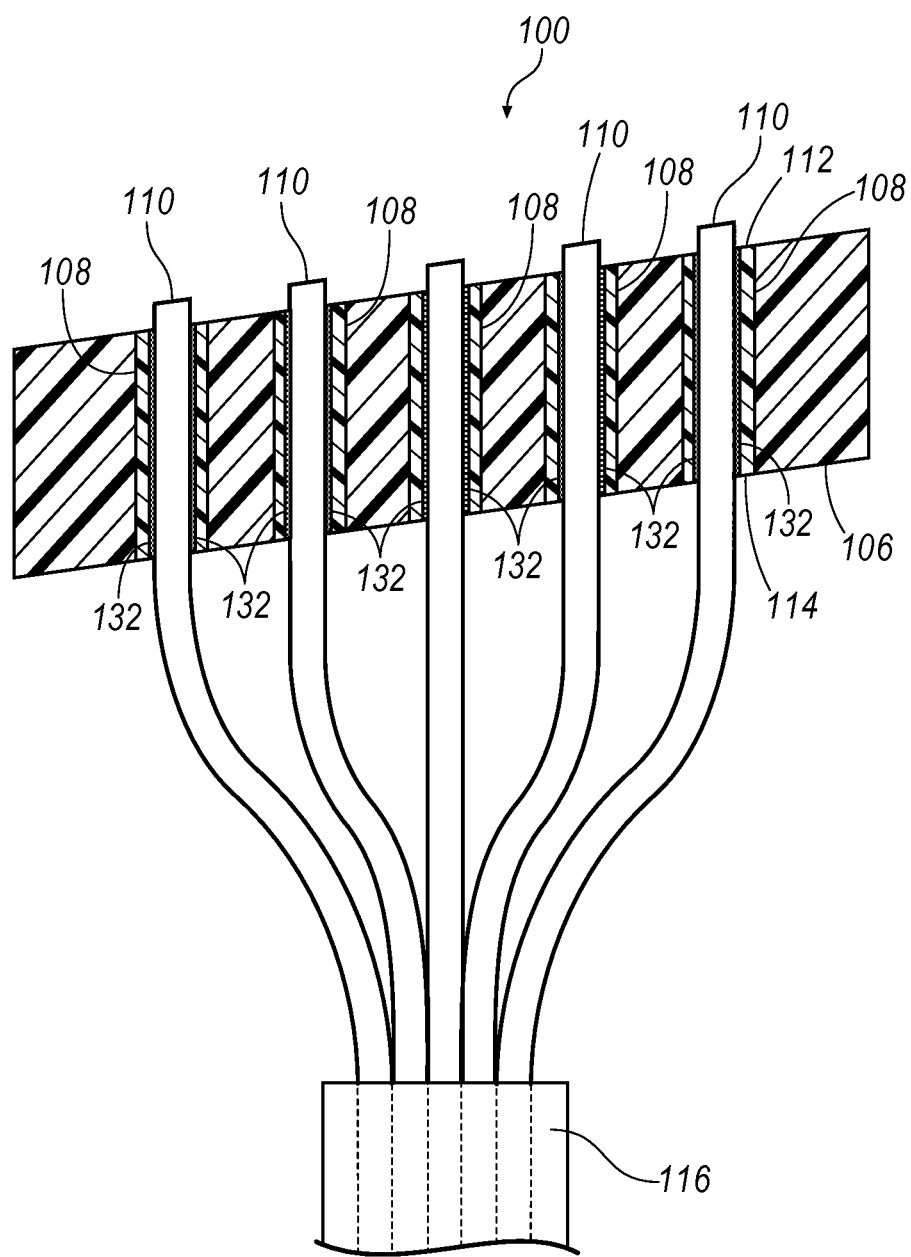
FIG. 2B illustrates a side cross-sectional view of a second arrangement of the exemplary optical multi-port connector shown in FIG. 1.

FIGS. 1, 2A and 2B illustrate an exemplary optical multi-port connector 100. In an exemplary configuration, the optical multi-port connector 100 contains a base 101 with an obverse face 104, a reverse face 106 opposite the obverse face 104, and at least one wall member 102 extending between obverse face 104 and reverse face 106. The optical multi-port connector 100 includes a multiplicity of inserts 108 extending through the multi-port connector 100 from obverse face 104 to reverse face 106 and substantially parallel to one another. Inserts 108 may be parallel to wall member 102. Inserts 108 may be perpendicular to obverse face 104 for an ultra physical contact (UPC) configuration as shown in FIG. 2A, or they may deviate from the perpendicular by approximately eight degrees for an angle polished connector (APC) configuration, as shown in FIG. 2B. Reverse face 106 may be perpendicular to inserts 108 or, when obverse face 106 deviates from perpendicular, reverse face may be parallel to obverse face. Optical fibers 110 are aligned within and extend through the inserts 108.

The exemplary optical multi-port connector 100 has at least one row of inserts 108. Each insert 108 may have a first end 112 and a second end 114, and inserts 108 extend through base 101 of the optical multi-port connector 100 from the obverse face 104 to the reverse face 106. Inserts 108 are substantially parallel to one another and to wall member 102. The first ends 112 of the inserts 108 coincide with the obverse face 104 of base 101 of optical multi-port connector 100, and the second ends 114 of the inserts 108 coincide with the reverse face 106 of base 101 of optical multi-port connector 100. The shapes of the cross-sectional areas of inserts 108 may be round, oval, polygonal, or any other suitable shape. Inserts 108 have cross-sectional areas larger than the diameter of an optical fiber 110. Inserts 108 may be arranged in a matrix with a multiplicity of rows and columns of inserts, and an optical multi-port connector 100 may contain over one hundred inserts 108 and the same number of optical fibers 110.

The inserts 108 may be of a different material that the base material; specifically, base 101 may be of a hard plastic or other relatively inflexible material, while inserts 108 may be of a softer plastic, a synthetic rubber, or other material that may offer more resilience than the base material. Additional characteristics desired in the inserts 108 include material that may be lengthened upon heating and may bond to base 101 upon heating and elongating, material which may be drilled, and material which will have some flexibility and resilience compared to the material chosen for base 101. The inserts 108 may be bonded to base 101.

Holes 130 may be drilled longitudinally through inserts 108, and holes 130 may be sized and configured to accept optical fibers 110. Only one hole 130 may be drilled through each insert 108, and each hole 130 may accept only one optical fiber 110. Optical fibers 110 may be inserted in and secured to holes 130 although, in some cases, not all the inserts 108 will have an optical fiber 110 extending through them. Each of the optical fibers 110 may extend from a fiber optic or ribbon cable 116 or other device carrying multiple optical fibers to the second end 114 of an insert 108 in base 101, through insert 108, and may extend a small amount beyond first end 112 of insert 108. Optical fibers 110 may be secured in holes 130 with an epoxy 132 or other suitable means. Epoxy 132 may be inserted in holes 130 prior to the insertion of optical fibers 110 to secure fibers 110. The tips of optical fibers 110 may be polished by any conventional means to ensure the end face geometry and to facilitate core-to-core connections and the accompanying robust connections between pairs of optical fibers 110 in mating multi-port connectors 100.

A laser may be used to align and drill holes 130, which may ensure accuracy in the placement of holes 130 with respect to one another. The holes 130 may all be drilled simultaneously. Each hole 130 may be in the center of an insert 108. However, holes 130 may be slightly off-center with respect to the outer periphery of insert 108, and still be within the teaching of this disclosure as long as holes 130 are located properly with respect to one another, thereby ensuring that they are aligned with one another when mating two multi-port connectors, and are situated sufficiently toward the center of inserts 108 to ensure that insert 108 will allow opposing fibers 110 to move away from one another when indicated.

When mating multi-port connectors, pairs of optical fibers 110 may contact one another. Due to the large number of fibers in each multi-port connector, there may be some unevenness in the heights of the fibers. The connection should allow the fibers to remain in concentric alignment with one another, rather than pushing against one another and creating head-on forces and pushing one another out of alignment. Using multi-port connectors that have inserts 108 with more resiliency than the material used for the base 101 allows optical fibers 110 that extend sufficiently far that they press against the opposing optical fiber 110 and create head-on forces to move away from the opposing optical fiber. This will alleviate any extra head-on forces between the fiber pair, allowing the opposing pair of optical fibers 110 to maintain concentric alignment one with one another, thus facilitating a more robust signal transmission.

Alignment holes 118 may be defined within the base 101 of the optical multi-port connector 100, and may be configured to receive an alignment pin 120. Alignment pins 120 may be inserted into alignment holes 118. Thus, adapters with opposing pairs of holes, where the holes are configured to receive the alignment pins 120, may be used to connect two multi-port connectors 100 to one another. Alignment holes 118 may be drilled at the same time as holes 130 for optical fibers 110. A laser may be used to align holes 130 and alignment holes 118, ensuring that holes 130 are aligned properly with respect to one another, and that holes 130 are aligned properly with respect to holes 130 in the opposing multi-port connector. This will allow multi-port connectors to be connected to one another and, if alignment holes 118 align with one another, holes 130 and optical fibers 110 will also align properly with one another.

The base 101 of optical multi-port connector base 100 may be formulated from a hard plastic such as a polyurethane, a polyester, a polystyrene, or a phenolic resin, although any other suitable material may be used. Suitable materials include any materials which may be deformed upon heating; specifically, materials which may be stretched longitudinally upon heating and which will become narrower upon stretching, materials which can bond to the material that is chosen for inserts 108, material which can be both cut and drilled, and material which is harder and less resilient than the material chosen for inserts 108.

Figure 3:
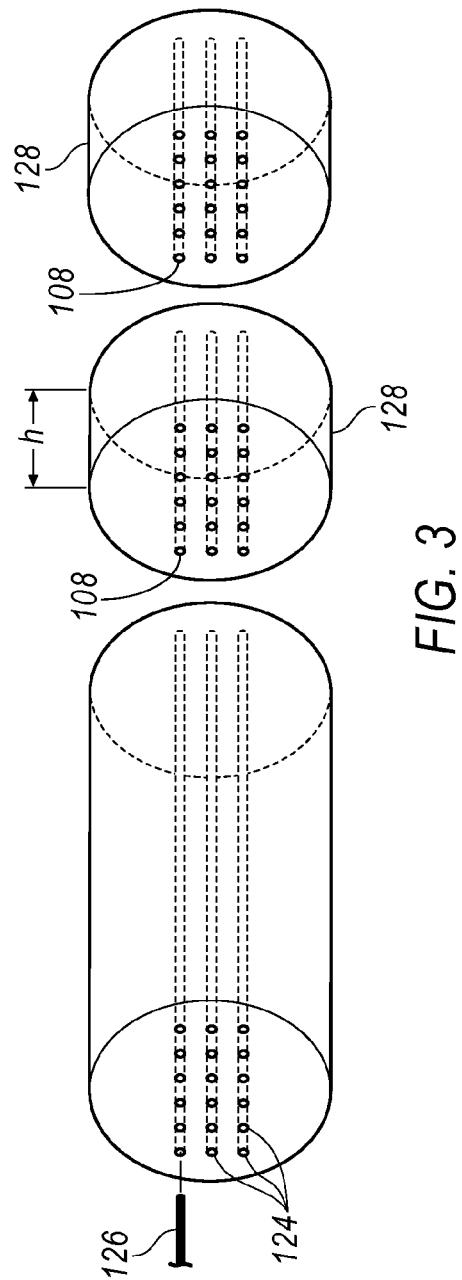
FIG. 3 illustrates a partial sectional view of a bar which may be used to make the exemplary optical multi-port connector, and discs cut from the bar.

To prepare the multi-port connector with resilient inserts through which the optical fibers extend, a bar 122 of a suitable material may be prepared with a multiplicity of holes 124 extending longitudinally through the bar 122, as shown in FIG. 3. As shown, the bar 122 is cylindrical, but it may be oval, rectangular, or any other suitable shape.

Rods 126 may be inserted into holes 124. Rods 126 may be sized and configured so that they will fit within and conform to the shape of holes 124 within bar 122. Suitable material for rods 126 may be material that is softer and more resilient than the material chosen for base 101, material that may be lengthened upon heating and may bond to base 101 upon heating and elongating, material which may be drilled, and material which will have some flexibility compared to the material chosen for base 101. Suitable material for rods may include materials such as a polyethylene, a polypropylene, or a polyvinyl chloride or any other suitable material.

Once rods 126 have been inserted into the holes 124, bar 122 with rods 126 may be heated to a suitable temperature so that both bar 122 and rods 126 may be deformed; specifically, so that they may be stretched in a longitudinal direction. The temperature should also be sufficiently high to allow the harder material of bar 122 to bond to the softer material of rods 126. The suitable temperature will differ depending on the types of materials used. Once heated, bar 122 and rods 126 may be stretched, thus becoming longer and narrower. The material chosen for both the rods 126 and the bar 122 should maintain their geometric relationships to one another, even as they become longer and narrower.

Figure 4:
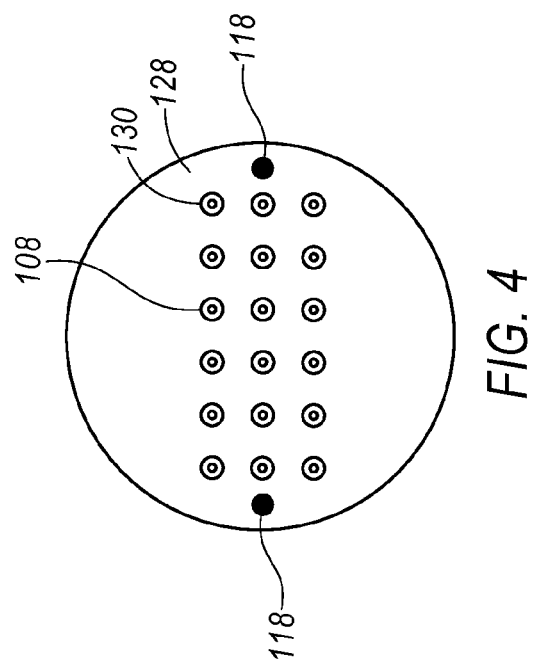
FIG. 4 illustrates a top view of a disc illustrated in FIG. 3 that has been cut from the bar.

After bar 122 has been stretched and cooled, it may be cut into discs 128, shown in FIG. 4. The cuts may be perpendicular to the length of bar 122, or they may be angled eight degrees from the perpendicular. Alternatively, a disc 128 may have one face cut perpendicular to the length of bar 122 and a second face cut at an angle of eight degrees from the perpendicular. Each disc 128 cut in this way will be of the harder material of bar 122, and will have a multiplicity of inserts 108 in it, and with each insert 108 being of the softer material of rods 126. The cuts on bar 122 may be done by laser or any other suitable means.

Each disc 128 may be cut, by laser or any other conventional cutting means, into the shape desired for base 101. The desired shape for base 101 may be a rectangle, resulting in a rectangular prism as base 101, or it may be a circle, a square, a polygon, or any other suitable shape. When cutting disc 128 into base 101, cuts should be parallel to the longitudinal dimension of inserts 108.

A hole 130 may be drilled in each of a multiplicity of the inserts 108 for the insertion of optical fibers 110. The holes 130 may be drilled by laser and a laser matrix may be used to precisely align the holes 130. Each of the holes 130 may be sufficiently toward the center of insert 108 that an optical fiber inserted into and secured in the hole will be able to move longitudinally with respect to the base. The holes 130 may extend longitudinally through inserts 108, from the first ends 112 to the second ends 114 of the inserts. The concentricity and the position of the holes 130 for the optical fibers 110 within the inserts 108 and in relation to one another, and hence, the concentricity of the optical fibers themselves within the inserts 108, can be well controlled by using laser drilling. Thus, when an optical multi-port connector 100 is properly aligned with a similar optical multi-port connector, the fiber pairs will be concentrically aligned in relation to one another.

Once the holes 130 are drilled, optical fibers 110 may be inserted into the holes. Only one fiber 110 may be inserted into each hole 130, although not every hole 130 need have a fiber 110 inserted within it. Fibers 110 may be secured within the holes with an epoxy 132. Epoxy 132 may be introduced into holes 130 prior to the insertion of fibers 110. The optical fibers 110 may be inserted from the second ends 114 of the inserts 108, through inserts 108, and will extend slightly beyond the first ends 112 of the inserts 108 and the obverse face 104 of the base 101 of optical multi-port connector 100. If a fiber 110 extends too far beyond the second end of insert 108, it may be trimmed to the proper length. Once fibers 110 are inserted into holes 130, epoxy 132 may be cured.

The ends of the optical fibers 110 may be polished using any conventional means. Polishing may remove any residual epoxy 132 attached to fibers 110, and may properly contour the ends of fibers 110 so the fibers, when aligned with fibers in a mating connector, may more easily contact one another, thus facilitating a good connection. After polishing, the optical fibers 110 will continue to extend a small amount (several nanometers) from the obverse face 104 of base 101 of the optical multi-port connector 100, which allows them to contact the fibers in a mating multi-port connector.

A multiplicity of alignment holes 118 may be drilled in base 101. The alignment holes 118 may be drilled at the same time as the holes 130 for optical fibers 110. Using a laser to properly position alignment holes 118 with respect to holes 130 for optical fibers may facilitate robust connections between mating multi-port connectors, as mating pairs of fibers may be properly aligned with one another. The alignment holes 118 are configured so that each alignment hole 118 will accept an alignment pin 120 which may be secured in place. The alignment holes 118 of a connector 100 may be positioned in such a way that, when aligned with an adapter (not shown) and a second connector 100, optical fibers 110 are in concentric alignment with one another. In this way, when connecting two optical multi-port connectors 100, an alignment hole 118 on one connector 100 may accept an alignment pin 120 on the opposite connector 100, thus aligning the optical fibers 110 with one another.

Two optical multi-port connectors may then be connected to one another by pushing the two optical multi-port connectors 100 into opposite sides of an adapter. This will align the alignment pins 120 of one of the optical multi-port connectors with corresponding alignment holes 118 in the second optical multi-port connector 100. The ends of the optical fibers 110 that extend from the base 101 of one optical multi-port connector 100 will align with the ends of the optical fibers 110 in the base 101 of the second optical multi-port connector 100. Due to the softness and resilience of the material of the inserts 108, each insert 108 may act as a spring allowing fibers 110 within inserts 108 to move axially, independently of base 101. The "springiness" or resilience of inserts 108 allows optical fiber pairs in which at least one of the fibers 110 extends such an amount that it presses against the opposing fiber, creating head-on pressure, to bias one another in opposing directions while still retaining concentric alignment with one another. The more rigid material of base 101 may not move in accord with the pair. Thus, each pair of optical fibers in the connector 100 may align with one another. Any head-on forces between the fiber pairs may result in one or both fibers being biased away from the other, yet still remaining in concentric alignment.

Allowing the soft material of the inserts to manage the fiber head-on contact force may result in high quality connections between the optical fibers 110. An optical multi-port connector made in this fashion may be able to hold many more optical fibers than traditional optical multi-port connectors.

Figure 5:
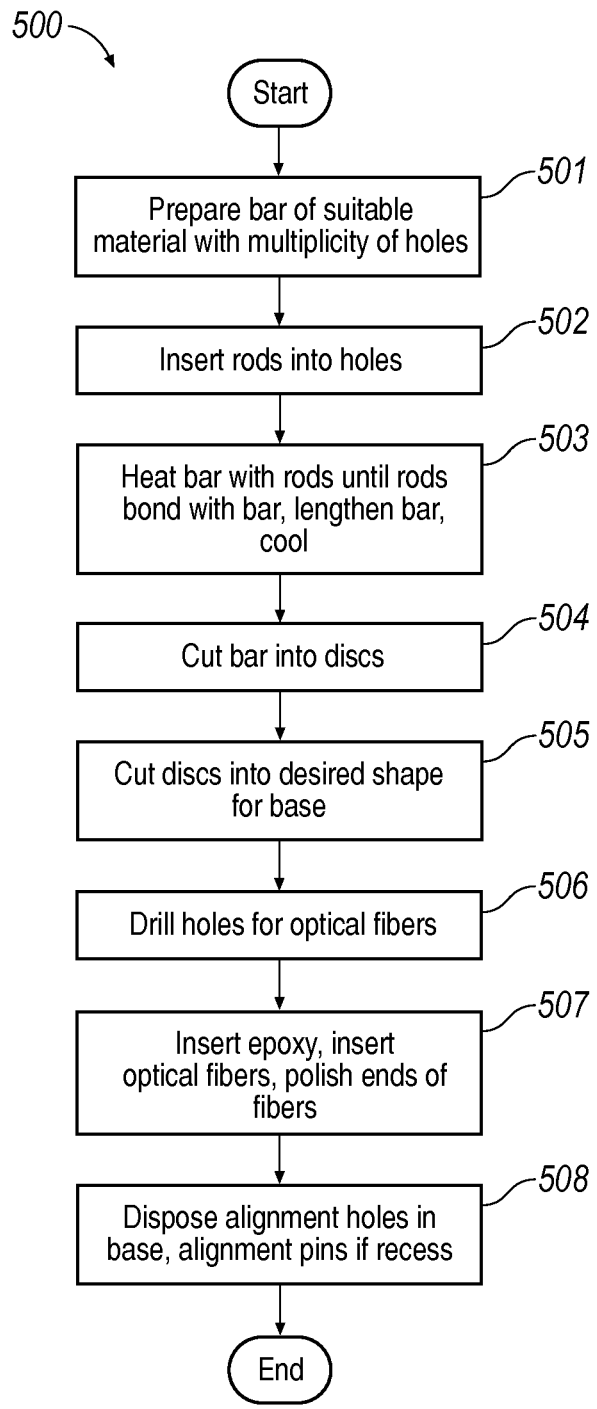
FIG. 5 illustrates a flowchart for a method for an exemplary optical multi-port connector.

FIG. 5 illustrates a flowchart of an exemplary optical multi-port connector system 500, as disclosed in the system of FIG. 1. The process starts in block 501, in which a bar 122 of a suitable material is prepared with holes 124 extending longitudinally through the bar. A suitable material is one that is hard but may be deformed, specifically, stretched longitudinally upon heating, that will bond to the material that has been chosen for inserts 108, and that may be cut and drilled. Suitable materials may include many hard plastics such as polyurethanes, polyesters, polystyrenes or phenolic resins, although other suitable materials may be chosen. The bar 122 may have a circular profile, or it may be oval, rectangular, polygonal, or any other suitable shape.

Continuing in block 502, rods 126 are inserted into holes 124 of bar 122. Rods 126 may be configured so that they will fit within and conform to the shape of holes 124. Suitable materials for rods 126 are materials that are softer than the material chosen for bar 122, materials that will deform and be able to be lengthened upon heating, and that will bond to the material chosen for base 101 upon heating and stretching. The material chosen may come from the group including polyethylenes, polypropylenes, or polyvinyl chlorides, or other suitable materials.

Block 503 shows the heating and lengthening of bar 122. As bar 122 is heated and lengthened, the material of base 101 bonds to the material of rods 126. Once bar 122 has reached the desired dimensions, and once rods 126 have bonded to base 101, bar 122 may be cooled.

Next, in block 504, bar 122 may be cut into discs 128. Each disc 128 may have a height h, where h is the desired thickness of base 101. The discs may be cut by laser, or by any other conventional cutting means. When cutting discs 128, the cuts on bar 122 may be perpendicular to the length of bar 122. When bar 122 is cut into discs 128, rods 126 which have bonded to bar 122 become inserts 108 extending through disc 128. Each disc 128 may have a multiplicity of inserts 108 extending through the disc 128 and perpendicular to the cut faces of the disc.

In block 505, the discs 128 may be cut into the desired shape of base 101. Then, as shown in block 506, holes 130 may be drilled in a multiplicity of inserts 108 for the insertion of optical fibers 110. Each hole 130 may extend longitudinally from the first end 112 of an insert, through the insert 108 and to the second end 114 of insert 108. The concentricity and alignment of holes 130 within the inserts 108, and hence, the concentricity of the optical fibers themselves, may be well controlled with laser drilling. Block 507 discloses optical fibers 110 being inserted into holes 130, and secured therein with an epoxy 132 or other adhesive. The optical fibers 110 may be inserted through holes 130, from the first ends 112 to the second ends 114 of the inserts 108, and so they extend at least several nanometers beyond the second ends 114 of the inserts 108. The epoxy 132 may be inserted into holes 130 prior to the insertion of fibers 110. Once secured in the inserts 108, the ends of fibers 110 which extend beyond the second ends 114 of inserts 108 may be polished to remove any residual epoxy 132 and to properly contour the ends of the optical fibers so that they will make a better connection with opposing fibers. Polishing may be done using any conventional means.

A multiplicity of alignment holes 118 may then be drilled in base 101, as shown in block 508. The alignment holes 118 may be configured so that they may accept an alignment pin 120. Two connectors 100 may be connected to one another by inserting the alignment pins 120 of each connectors 100 and pressing connectors 100 together.

FIG. 5 shows block 506 occurring prior to blocks 507 and 508, although block 506 could alternatively be done after either block 507 or 508 without changing the result of the process described in the flowchart. Similarly, the actions in block 505 may be done prior to the activity described in block 504.

CONCLUSION

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A connector comprising:
   a base formed using a base material with at least one wall member that defines the perimeter of the base, an obverse face and a reverse face, the base defining a multiplicity of openings extending between the obverse face and the reverse face;
   a multiplicity of inserts each having a first end and a second end, each insert fitting within and conforming to the shape of a corresponding one of the multiplicity of openings;
   wherein the inserts are of a different material than the base material, the different material having more resilience than the base material;
   wherein the inserts are generally parallel to one another;
   wherein a single hole extends longitudinally through each of at least a subset of the inserts; and
   wherein each hole is configured to receive a single optical fiber.

2. The connector of claim 1 wherein the base is of one of polyurethanes, polyesters, polystyrenes or phenolic resins.

3. The connector of claim 1, wherein each hole has been simultaneously created.

4. The connector of claim 3, wherein each hole has been aligned with respect to the other holes.

5. The connector of claim 1, wherein the inserts are substantially perpendicular with the obverse face.

6. The connector of claim 1, wherein the obverse face is at an angle of approximately eighty two degrees from the inserts.

7. The connector of claim 1, wherein the inserts include one of round, oval, and polygonal cross-section.

8. The connector of claim 1, wherein the first ends of the inserts coincide with the obverse face of the base, and the second ends of the inserts coincide with the reverse face of the base.

9. The connector of claim 1, wherein the inserts are of one of polyethylenes, polypropylenes, or polyvinyl chlorides.

10. The connector of claim 1, wherein at least one alignment hole extends into the obverse face of the base material, and wherein the at least one alignment hole is aligned with respect to the holes that extend through the inserts.

11. The connector of claim 1, wherein each of a multiplicity of optical fibers passes through the hole of one of the inserts and a free end of each of the optical fibers extends beyond the surface of the obverse face of the base, and wherein the free end of each of the optical fibers is polished.

12. The connector of claim 11, the optical fiber being bonded to the insert wherein the resilience of the insert permits at least limited longitudinal movement of the optical fiber relative to the base.

13. The connector of claim 12, further comprising a second connector being connected to the first connector, wherein each of the fibers in the first connector has a corresponding fiber in the second connector in the form of a fiber pair.

14. The connector of claim 13, wherein at least one of the fibers in the fiber pair is in a resilient insert and can move so as to bias the at least one of the fibers in an opposing direction from the other fiber so as to minimize head-on pressures between the fibers and facilitate concentric alignment with the free ends of each fiber of the fiber pair.

15. A connector comprising:
- a base formed using a base material with at least one wall member that defines the perimeter of the base, an obverse face and a reverse face;
- a multiplicity of inserts each having a first end and a second end, extending through the base from the obverse face to the reverse face;
- wherein the inserts are of a different material than the base material, the different material having more resilience than the base material;
- wherein the inserts are generally parallel to one another;
- wherein a single hole extends longitudinally through each of at least a subset of the inserts;
- wherein each hole is configured to receive a single optical fiber; and
- wherein the inserts are bonded to the base material, and wherein the bonding is directly between the base material and the different material of the insert.

* * * * *